United States Patent [19]
Cavil et al.

[11] 4,262,643
[45] Apr. 21, 1981

[54] DIGITAL TIMING CONTROL SYSTEM FOR AN INTERNAL COMBUSTION ENGINE

[75] Inventors: David T. Cavil, Menomonee Falls; William R. Krueger, West Allis, both of Wis.

[73] Assignee: Outboard Marine Corporation, Waukegan, Ill.

[21] Appl. No.: 923,999

[22] Filed: Jul. 12, 1978

[51] Int. Cl.³ .............................................. F02P 5/04
[52] U.S. Cl. .................................... 123/416; 123/418
[58] Field of Search .......... 123/117 R, 117 D, 32 EB, 123/32 EC

[56] References Cited

U.S. PATENT DOCUMENTS

| | | | |
|---|---|---|---|
| 3,738,339 | 6/1973 | Huntzinger et al. | 123/117 R |
| 3,757,755 | 9/1973 | Carner | 123/117 R X |
| 3,991,727 | 11/1976 | Kawai et al. | 123/32 EA |
| 4,099,507 | 7/1978 | Pagel et al. | 123/117 D X |
| 4,133,323 | 1/1979 | Adler | 123/117 R |

*Primary Examiner*—Tony M. Argenbright

[57] ABSTRACT

Disclosed herein is a digital timing control system for an internal combustion engine comprising a processing circuit for receiving a cyclical engine timing reference pulse and for producing a cyclical control pulse offset from the reference pulse. The processing circuit includes a counter connected to a NAND gate for producing a control pulse when the counter reaches a preset count, a monostable device, subject to the control pulse, for resetting the counter, an oscillator for providing preload pulses to the counter for a predetermined period of time to establish a preload count, and a phase-locked loop, subject to the reference pulse, for transmitting a fixed number of signal pulses per engine revolution to the counter to increment the preload count until said preset count is reached, whereby the control pulse is produced. The system also includes a distributor for receiving the reference pulses and, subject to the control pulses, for converting each of the reference pulses into an output pulse for controlling an engine operating event, such as engine ignition.

17 Claims, 3 Drawing Figures

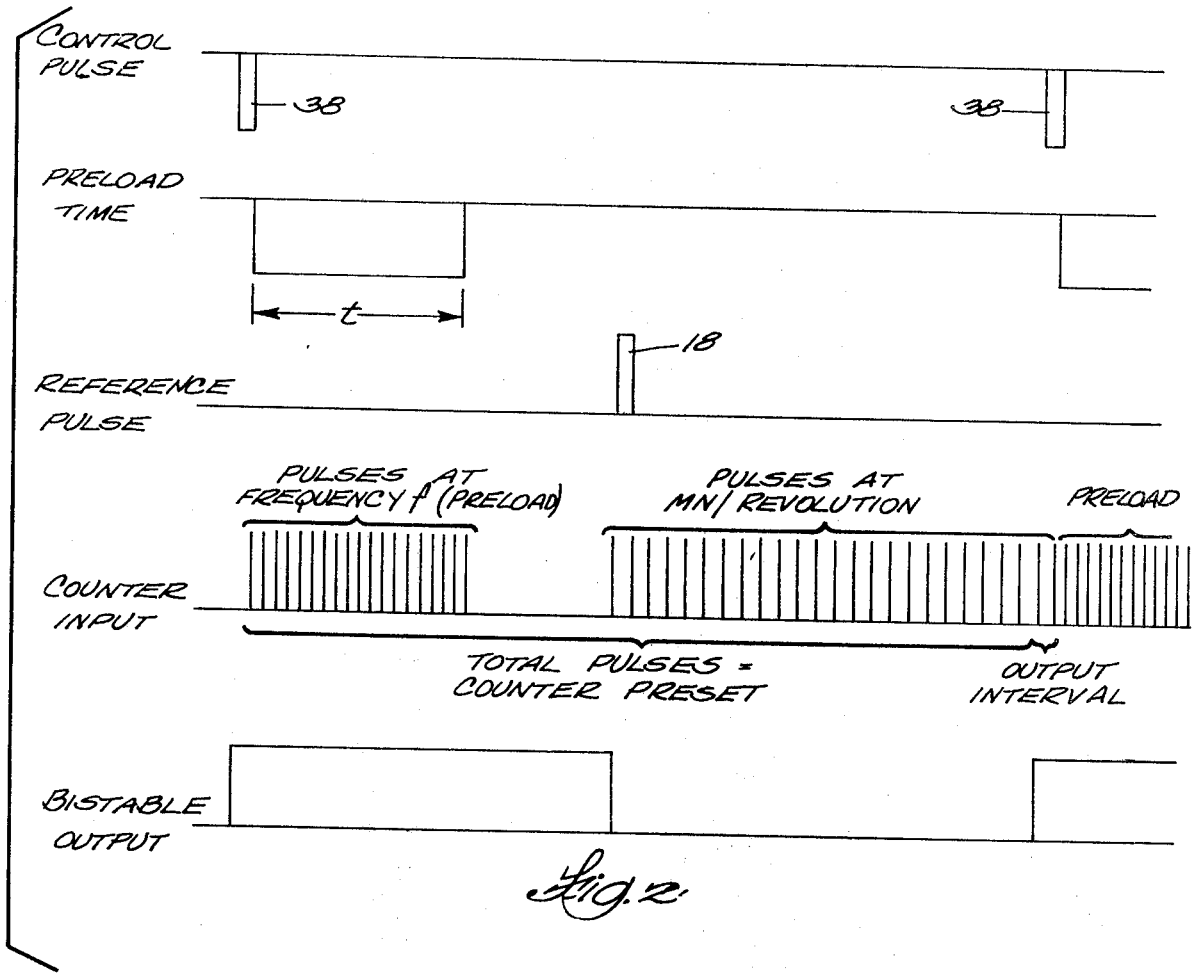
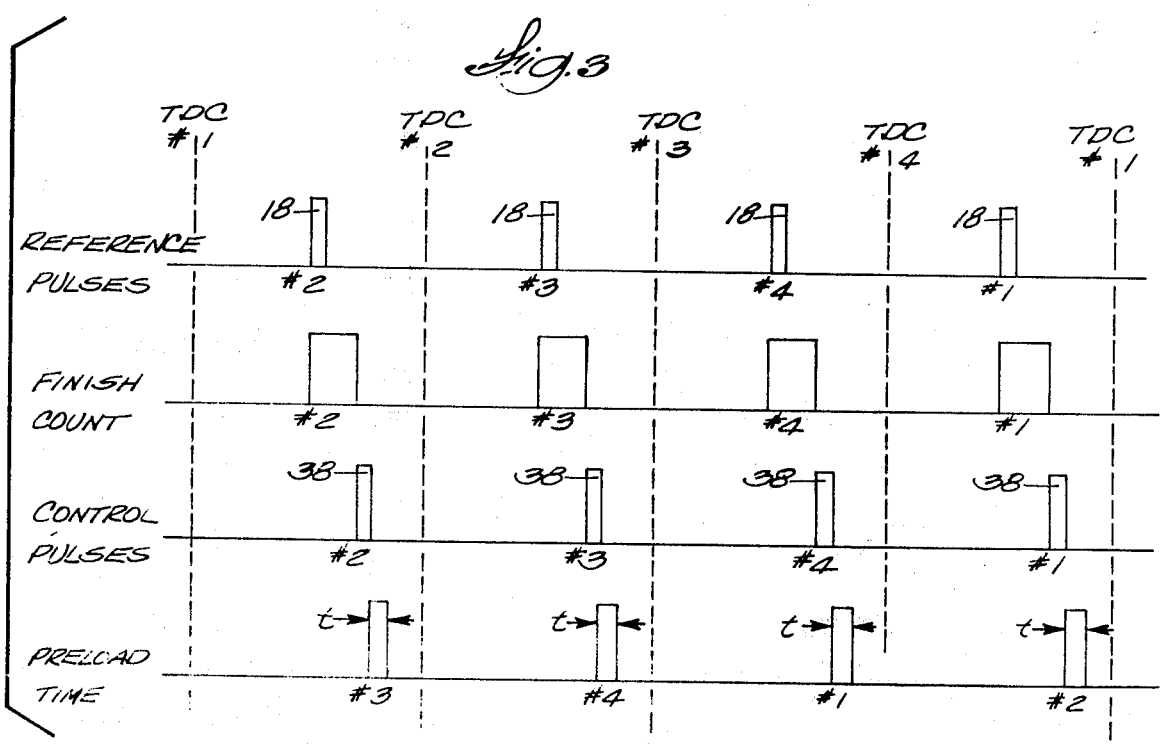

DIGITAL TIMING CONTROL SYSTEM FOR AN INTERNAL COMBUSTION ENGINE

BACKGROUND OF THE INVENTION

The invention relates generally to electronic control systems for controlling an operating event of an internal combustion engine, and more particularly, relates to a digital timing control system for controlling, for example, the timing of an ignition system or the timing of a fuel injection system of an internal combustion engine. Attention is directed to the following United States patents which disclose electronic control systems for internal combustion engines:

| Hartig | 3,696,303 issued October 3, 1972 |
| Stark | 3,923,021 issued December 2, 1975 |
| Lindberg | 3,780,711 issued December 25, 1973 |
| Richards | 3,955,723 issued May 11 1976 |

SUMMARY OF THE INVENTION

The invention disclosed herein provides a digital timing control system for an internal combustion engine for regulating an engine operating event, such as ignition timing, and includes processing circuit means for receiving a cyclical engine timing reference pulse and for producing a cyclical control pulse offset from the reference pulse. The processing circuit means includes means including a counter for producing the control pulse when the counter reaches a preset count, means, subject to the control pulse, for resetting the counter and for providing preload pulses to the counter for a predetermined period of time to establish a preload count, and means, subject to the reference pulse, for transmitting a fixed number of signal pulses per engine revolution of the counter to increment the preload count until the preset count is reached, whereby the control pulse is produced. The system also includes distributor means for receiving the reference pulse and, subject to the control pulse, for converting the reference pulse into an output pulse for controlling an engine operating event.

In accordance with an embodiment of the invention, there is provided a digital timing control system wherein the means for transmitting a fixed number of signal pulses per engine revolution includes a phase-locked loop having a loop output which provides the signal pulses. The phase-locked loop preferably includes an input for receiving "M" pulses per engine revolution, and the means for transmitting a fixed number of signal pulses also preferably includes frequency divider means or a divide by "N" counter connected to the phase-locked loop so that the loop oscillator frequency is "N" times the input frequency "M", whereby the loop output provides "MN" signal pulses per engine revolution. The product "MN" is large enough so that the loop output provides at least one signal pulse per degree of engine rotation to assure sufficient resolution for accurately controlling the engine operating event, such as ignition timing.

Also in accordance with an embodiment of the invention, there is provided a digital timing control system wherein the means for providing the preload pulses includes an oscillator having an output for providing the preload pulses. The oscillator preferably comprises a voltage controlled oscillator having an input for receiving a variable D.C. voltage. With this arrangement, the oscillator output provides preload pulses having a variable frequency dependent upon the magnitude of the variable D.C. voltage so that the preload count, and hence, for example, engine ignition timing, can be varied subject to the magnitude of the variable D.C. voltage.

Also in accordance with an embodiment of the invention, there is provided a digital timing control system wherein the means for transmitting a fixed number of signal pulses per engine revolution includes a phase-locked loop having a loop output which provides the signal pulses. The phase-locked loop also has a variable D.C. voltage output with a magnitude which is an analog of the speed of engine rotation. In this embodiment, the means for providing the preload pulses includes the voltage controlled oscillator which has an input for receiving the phase-locked loop variable D.C. voltage output. Thus, the oscillator output provides preload pulses having a variable frequency dependent upon the magnitude of the variable D.C. voltage output, whereby the preload count, and for example, the ignition timing, is varied subject to the speed of engine rotation.

Also in accordance with an embodiment of the invention, there is provided a digital timing control system wherein the means for providing the preload pulses further includes, in addition to an oscillator, monostable device means, responsive to a control pulse, for applying an enabling pulse to the oscillator for a predetermined period of time to enable the oscillator output to provide the preload pulses to the counter. Preferably, the means for transmitting the signal pulses from the phase-locked loop to the counter includes gate means and bistable device means, responsive to the reference pulse, for enabling the gate means for transmitting the signal pulses to the counter and, responsive to the control pulse, for disabling the gate means for preventing transmittal of the signal pulses until the occurrence of another reference pulse.

The invention disclosed herein also provides a digital timing control system for regulating the ignition timing of an internal combustion engine. The system includes transducer means for producing a plurality of cyclical engine timing reference pulses timed to correspond to the maximum desired advance for a plurality of corresponding engine cylinders, and processing circuit means for receiving the cyclical engine timing reference pulses and for producing, in a predetermined manner, cyclical control pulses respectively offset from the reference pulses to control the ignition timing of the corresponding engine cylinders. The processing circuit means includes means including a counter for producing one of the control pulses when the counter reaches a preset count, means, subject to the control pulse, for resetting the counter, and means including an oscillator having an output for providing preload pulses to the counter for a predetermined period of time to establish a preload count. The processing circuit means also includes rotation signal means for producing "M" pulses per engine revolution, a phase-locked loop including an input for receiving the "M" pulses per engine revolution and having a loop output, frequency divider means connected to the phase-locked loop for changing the loop oscillator frequency to "N" times the input frequency "M" so that the loop output provides "MN" signal pulses per engine revolution, the product "MN" being large enough so that the loop output provides at least one of the signal pulses per degree of engine rotation, and means, subject to a reference pulse, for transmitting the "MN" signal pulses to the counter to increment the preload count until the preset count is reached, whereby one of the control pulses is produced. The system also includes distributor means for receiving the cyclical reference pulses and, subject to the cyclical control pulses, for converting each of the reference pulses into an output pulse for triggering the ignition in a corresponding engine cylinder.

Also in accordance with an embodiment of the invention, there is provided a digital timing control system wherein the distributor means includes interfacing means for shaping each of the reference pulses to a first logic level, means including a NAND gate connected to a monostable device for producing a trigger pulse when one of the shaped reference pulses having the first logic level is applied to the NAND gate, clocked latch means having corresponding inputs and outputs for transferring, in response to a trigger pulse, a shaped reference pulse from one of the inputs to a corresponding output, and inverter/buffer means for inverting, in response to a control pulse, the shaped reference pulse appearing at the clocked latch output from the first logic level to a second logic level to provide the output pulse for controlling an engine operating event or triggering the ignition in a corresponding engine cylinder.

One of the principal features of the invention to the provision of a digital timing control system for an internal combustion engine which is reliable and relatively economical to manufacturer, and which incorporates processing circuit means for receiving a cyclical engine timing reference pulse, and for producing a cyclical control pulse offset from the reference pulse, and distributor means for receiving the reference pulse and, subject to the control pulse, for converting the reference pulse into an output pulse for controlling an engine operating event, such as ignition timing.

Another of the principal features of the invention is the provision of such a digital timing control system wherein the processing circuit means includes a phase-locked loop having an input for receiving "M" signal pulses per engine revolution, and a divide-by-N-counter connected to the phase-locked loop so that the loop oscillator frequency is "N" times the input frequency "M" so that the loop output provides "MN" signal pulses per engine revolution. The "MN" signal pulses are selectively applied to means including a counter which produces a control pulse when the counter reaches the preset count. The product "MN" is large enough so that the loop output provides at least one signal pulse per degree of engine rotation so that the system has sufficient resolution to accurately reflect and react to rapid changes of engine speed.

Another of the principal features of the invention is the provision of such a digital timing control system wherein the processing circuit means includes means including an oscillator for providing preload pulses to the counter for a predetermined period of time. The oscillator is preferably a voltage controlled oscillator having an input for receiving a variable D.C. voltage, whereby the oscillator output provides preload pulses having a variable frequency dependent upon the magnitude of the variable D.C. voltage. As a result, the preload count, and hence, the ignition timing, can be varied subject to the magnitude of the variable D.C. voltage.

Another of the principal features of the invention is the provision of such a digital timing control system wherein the oscillator utilized is the internal voltage controlled oscillator of a second phase-locked loop, and the first phase-locked loop includes a variable D.C. voltage output which is an analog of the speed of engine rotation and which is applied to the voltage controlled oscillator of the second phase-locked loop. In this arrangement, the engine ignition timing is varied in response to the change in speed of engine rotation.

Other features and advantages of the embodiments of the invention will become known by reference to the following drawings, general description, and claims.

DRAWINGS

FIG. 2 is a logic timing diagram for the control system shown in FIG. 1.

FIG. 3 is a timing diagram illustrating pulses produced by the control system shown in FIG. 1 for controlling the ignition of a four cylinder engine.

Figure 1:
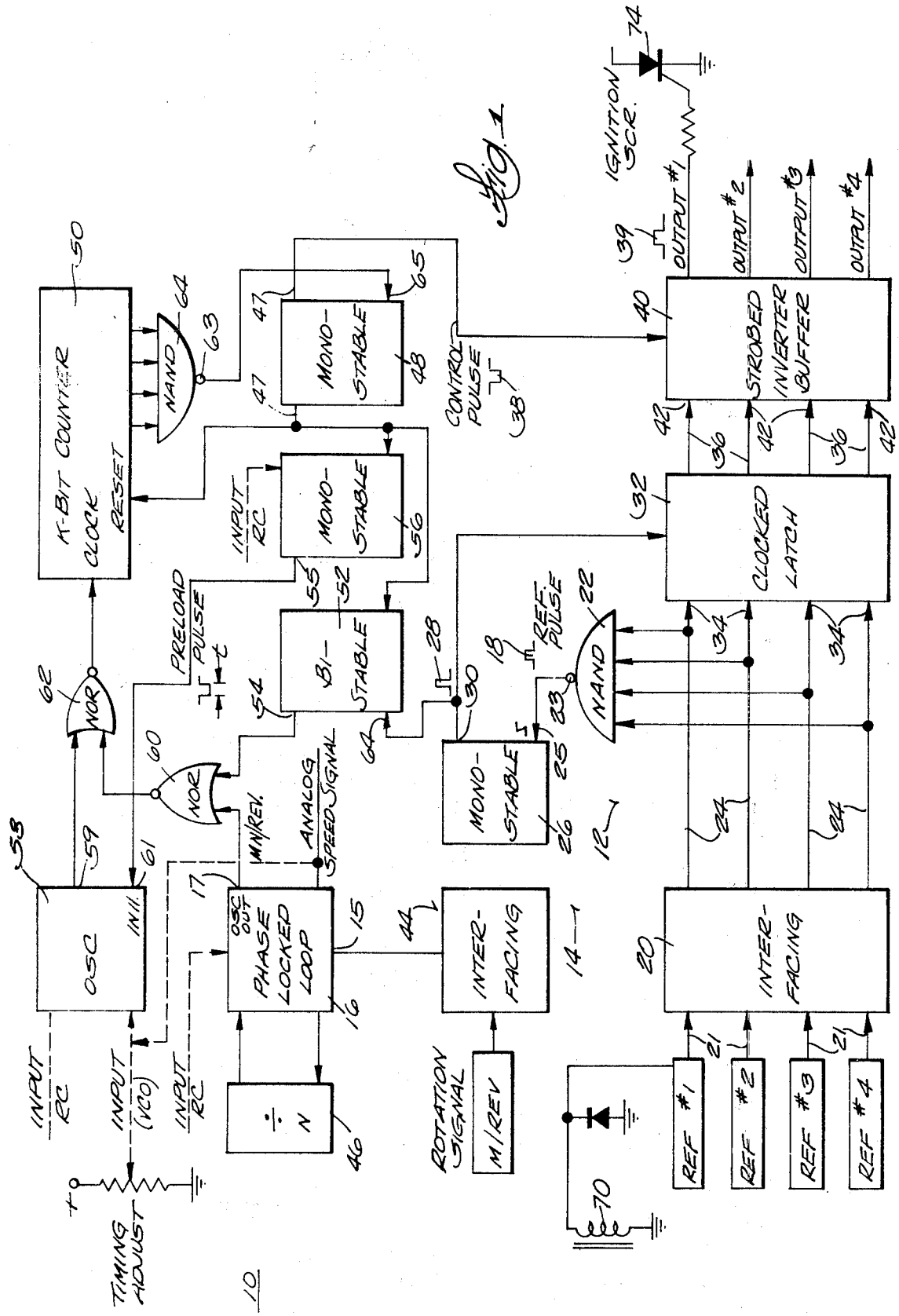
FIG. 1 is a schematic block diagram of a digital timing control system embodying various of the features of the invention.

Before explaining the embodiments of the invention in detail, it is to be understood that the invention is not limited in its application to the details of construction and arrangements of components set forth in the following description or illustrated in the drawings. The invention is capable of other embodiments and of being practiced and carried out in various ways. Also, it is to be understood that the phaseology and terminology employed herein is for the purpose of description and should not be regarded as limiting.

GENERAL DESCRIPTION

Shown in FIG. 1 is a digital timing control system 10 suitable for controlling the timing of the ignition or other operating events of an internal combustion engine (not shown). In its preferred form, the system incorporates processing circuit means or a processing circuit, generally designated 14, for receiving cyclical engine timing reference pulses and for producing cyclical control pulses offset from the reference pulses. The system 10 also preferably includes for a multi-cylinder engine, distributor means or a distributor, generally designated 12, for receiving the reference pulses and, subject to the control pulses, for converting the reference pulses into output pulses for controlling the timing of the engine ignition, or if desired, for controlling another engine operating event, such as injection of fuel.

Throughout this description, reference will be made to digital logic components such as NAND and NOR gates, and to monostable and bistable devices. It is to be understood that these separate, individual devices are conventional and can be made up of suitable commercially available intergrated circuits or other circuit elements which perform the required logic and other functions. Specific suitable components corresponding to the "block diagrammed" components shown in FIG. 1 will be identified in a list below.

Returning first to a description of the operation of the distributor means or distributor 12, which is shown in a form suitable for controlling the ignition timing of a four cylinder engine, the system 10 preferably includes transducer means for transducers labeled "Ref. #1, #2, #3 and #4" for developing cyclical engine timing reference pulses 18 (see FIGS. 2 and 3). These pulses may be developed, for example, by transducers consiting of magnetic, photoelectric, or Hall devices, and, preferably are timed to be as far in advance of top dead center as the maximum desired ignition spark advance. The distributor 12 is shown with four inputs and outputs for controlling the ignition timing of a four cylinder engine, but can be modified, by changing the number of inputs and outputs, to be suitable for an engine having as many cylinders as desired. A separate transducer, such as a trigger coil 70 (one shown), can be used for each corresponding engine cylinder, or some other arrangement can be used, to provide a cyclical engine timing reference pulse for each cylinder.

The reference pulses 18 are fed into interfacing means or an "interfacing" device 20 which shapes the reference pulses or converts them to logic levels compatible with the other logic elements. More particularly, when a reference pulse is applied to one of the inputs 21 of the interfacing device 20, the corresponding interface output line 24 has a "low" output. In the absence of a reference signal, the outputs 24 of the interfacing device 20 are all high so the output of NAND gate 22 is low.

When a reference pulse 18 is present on any of the interface output lines 24, the output 23 of NAND gate 22 goes high or applies that reference pulse 18 to the input 25 of monostable device 26 causing it to provide a narrow trigger pulse 28 on its output 30 as shown in FIG. 1. This trigger pulse 28 is much narrower than the reference pulse 18 and strobes a clocked latch means or a clocked latch 32 causing the one of its inputs 34 which is low to be transferred to to a corresponding clocked latch output 36.

When a control pulse 38 (see FIGS. 2 and 3, described further below) is provided from the processing circuit 14 and applied to inverter/buffer means or a strobed inverter/buffer 40, a high output pulse 39 will appear only on the output of the inverter/buffer 40 which has its input 42 at a low level. The outputs of the inverter/buffer are shown in FIG. 1 and labeled Output #1, #2, #3, and #4 to correspond to the transducers labeled REF #1, #2, #3 and #4. The control pulses 38 and resulting output pulses 39 occur at substantially the same time, and hence only the control pulses 38 are shown in FIGS. 2 and 3. In this manner the circuit components of the distributor 12 remember which reference pulse 18 last appeared, at which input of the interfacing device 20 and, subject to a control pulse 38, provide an output pulse 39 at a corresponding output. This output pulse can be used, for example, to trigger an ignition SCR 74 (one shown) utilized in a CD ignition system, or to control some other engine operating event. The control pulse 38 could be used directly without a distributor to control an engine operating event of a single engine cylinder.

The components and operation of the components of the processing circuit means or processing circuit 14 will now be described. The processing circuit 14 preferably includes engine rotation signal means (shown by a block labeled "M/REV") which produces a fixed number or "M" pulses per engine revolution. The engine rotation pulses can be provided by a separate component, such as a flywheel alternator, or can be provided from the output 30 of the monostable device 26, which provides as many pulses per engine revolution as there are reference pulses per engine revolution. These rotation pulses are applied through a suitable interfacing device 44 to the input 15 of a phase-locked loop 16. The operation of phase-locked loops is well covered in the literature. See, for example, RCA Cos/Mos Integrated Circuits, SSD-203C, 1975 Databook Series, pp. 227-233, RCA, Somerville, N.J. 1974.

The phase-locked loop 16 has its own internal voltage-controlled oscillator (not specifically shown) which locks onto the rotation pulses applied to the input 15. As shown in FIG. 1, frequency divider means or a divide by "N" counter 46 is preferably connected to the phase-locked loop so as to be placed between the internal voltage controlled oscillator and the internal comparator circuits of the phase-locked loop. This results in the loop oscillator running at a frequency "N" times that of the input frequency "M", to provide a loop output 17 having "MN" signal pulses per engine revolution. The product "MN" should be large enough so that the loop output provides at least one signal pulse per degree of engine rotation to assure sufficient resolution for ignition timing.

As will be appreciated by those skilled in the art, the phase-locked loop also has a variable D.C. voltage output which is proportional to the voltage placed on its internal voltage controlled oscillator to bring it into step with the frequency of the input signal, or in this case, "N" times the input frequency. Since the input frequency is directly proportional to engine speed, the magnitude of this variable D.C. voltage output is an analog signal of engine speed. The optional use of this output, labeled "Analog Speed Signal" in FIG. 1, in connection with a voltage controlled oscillator of, for example, a second phase-locked loop, will be explained below.

The other digital logic and other components included in the processing circuit 14 will be introduced in the description of the system operation which follows. With reference to FIGS. 1 and 2, it is presumed that a control pulse 38 has just been produced at the outputs 47 of monostable device 48. This causes an output pulse 39 to appear at the appropriate output i.e., #1 or #2, etc., of the inverter/buffer 40, resets a K-bit counter 50, and causes the output 54 of bistable device 52 to go high. As will be described in more detail below, the counter 50 causes the production of a control pulse 38 when it reaches its preset count. The trailing edge of the control pulse 38 triggers monostable device 56 which lays over for a predetermined time "t" (shown schematically in FIG. 1) during which the output 55 of the device 56 removes the inhibit signal from, or enables an oscillator 58. The oscillator 58 includes an output 59 for providing preload pulses at a frequency "f" to the counter 50, as will be described below.

As noted above, when the control pulse 38 is produced, the output 54 of the bistable device 52 is high, causing the output of a NOR gate 60 to remain low, blocking the signal pulses from the phase-locked loop, but conditioning a NOR gate 62 to pass the preload pulses from the oscillator 58 to the K-bit counter 50. The counter 50 now counts the pulses from the oscillator 58 during the interval "t" that the oscillator inhibit terminal 61 is low. This puts a fixed number of counts, or a preload count, into the counter 50 depending on the frequency "f" of the preload pulses and the interval "t". The counter preload is independent of engine speed, assuming the oscillator has a fixed frequency "f". At the end of time "t", the oscillator 58 is shut down and nothing happens until a reference pulse 18 appears.

After the occurrence of a reference pulse 18, trigger pulse 28, produced by monostable 26, (as previously described) is applied to the input 64 of bistable 52 causing it to reset, and its output 54 goes low. Signal pulses from the phase-locked loop 16 are now fed through NOR gate 60 and NOR gate 62 to the K-bit counter 50 causing it to continue counting from the preload point. Each count now, however, corresponds to an exact amount of engine rotation as there are "MN" pulses per engine revolution. The counter 50 continues counting unit it reaches its preset point which is determined by NAND gate 64. Although a four bit preset is shown, the preset can include any number of bits up to "K" bits. When the preset is satisfied, the output 63 of NAND gate 64 goes low and is applied to the input 65 of triggering monostable device 48, which in turn, produces the control pulse 38 at its output 47, thereby strobing the inverter/buffer 40, and starting the above described sequence over again, in response to the next reference pulse.

It should be noted that the K-bit counter 50 counts a fixed number of pulses which are proportional to engine rotation after the reference pulse 18 occurs. This number is equal to the counter preset value minus the counter preload. If the preload is large, few pulses proportional to engine rotation are required to produce an output after the reference pulse occurs. This would correspond to a large ignition timing advance. If the preload is small, the opposite is true. Note that the timing point is independent of engine speed and is determined by the preload count. This count can be controlled by oscillator 58 frequency "f" and preload time "t" determined by monostable device 56 (see FIG. 2). FIG. 3 shows the timing diagram for a four cylinder engine. Note that the preload time for the #3 cylinder occurs immediately after the control output pulse for the #2 cylinder, etc.

Possible timing control points are indicated by the dotted "input" arrows shown and labeled in FIG. 1. Time "t" can be changed by changing the RC time constant of monostable device 56. Frequency "f" can be varied by changing the RC time constant of the oscillator 58 or, if it is a voltage controlled oscillator, by changing an input voltage. Use of a voltage controlled oscillator allows a timing change sensitive to engine speed by using the variable D.C. voltage output or "Analog Speed Signal" (discussed earlier) from the phase-locked loop to modify the input voltage signal to the oscillator. The internal voltage controlled oscillator of an additional second phase-locked loop (not specifically shown) could be used as the oscillator 58 if desired. Changing the RC time constant of the phase-locked loop oscillator would not change the loop oscillator frequency, but would modify the analog speed signal output which could then change the frequency "f".

The digital timing control system 10 is particularly suitable for controlling a capacitor discharge (C.D.) ignition system for a four cylinder engine as will now be more particularly described. Reference pulses 18 are obtained from the trigger coils 70 (one shown) normally used to operate the engine ignition system. The rotational signal, "M" pulses per engine revolution, can be obtained from a flywheel alternator (not shown). The phase-locked loop and divide by "N" counter are selected so that 768 signal pulses per engine revolution are produced. The output pulses fire the ignition SCRs 74 (one shown) of the C.D. ignition system. The voltage controlled oscillator section of an additional phase-locked loop is used as the oscillator 58 and two NOR gates (not specifically shown) are used to create the bistable device 52.

A preload time "t" of 500 micro-seconds is used with an oscillator frequency "f" of between 120 and 240 KHz to give a timing swing of 18° ATDC to 37° BTDC. As shown in FIG. 1, a potentiometer can be used to provide a variable D.C. voltage to the input of the oscillator for varying the preload count, and hence, for allowing for an ignition timing adjustment. The reference pulses 18 are at approximately 45° BTDC. The K-bit counter 50 is 8-bit and the preset is 240 pulses. The outputs from the monostable devices 26 and 48, including the trigger pulses 28 and control pulses 38 are 100 micro-seconds. Appropriate values for the RC timing elements associated with the phase-locked loop, voltage controlled oscillator, and monostable devices can be determined, knowing the above frequencies, with the aid of the previously mentioned RCA Cos/Mos handbook.

As noted as the beginning of this description, the digital logic and other components which have been described and which make up the digital timing control system 10 can be made up of separate commercially available components. For example, the control system 10 can be built of RCA Cos/Mos devices having model numbers which correspond to the numbered components shown in FIG. 1 as follows:

In the distributor 12;

| | | |
|---|---|---|
| Interfacing means 20 | CA 3045 | Transistor amplifier |
| | CD 4071 | Pulse shaping gates |
| Clocked latch 32 | CD 4042 | |
| Inverter/buffer 40 | CD 4502 | |
| NAND Gates 22, 64 | CD 4012 | Gate 22 utilized in both distributor 12 and processing circuit 14 |
| Monostable devices 26, 47 and 56 | CD 4098 | Device 26 utilized in both distributor 12 and processing circuit 14 |
| In the processing circuit 14; | | |
| Interfacing means 44 | CA 3045 | Transistor amplifier |
| | CD 4011 | Pulse shaping gates |
| Phase-locked loop 16 | CD 4046 | |
| Divide by "N" Counter 46 | CD 4520 | |
| Oscillator 58 | CD 4046 | Internal VCO of second phase-locked loop |
| NOR gates 16, 62 | CD 4001 | |
| Bistable device 52 | CD 4001 | Two interconnected NOR gates |
| Counter 50 | CD 4520 | |

It is to be understood that the invention is not confined to the particular construction and arrangement of components herein illustrated and described, but embraces all such modified forms thereof as come within the scope of the following claims.

What is claimed is:

1. A digital timing control system for an internal combustion engine comprising processing circuit means for receiving a cyclical engine timing reference pulse and for producing a cyclical control pulse offset from said reference pulse, said processing circuit means including means including a counter for producing said control pulse when said counter reaches a preset count, means, subject to said control pulse, for resetting said counter and for providing preload pulses to said counter for a predetermined period of time to establish a preload count, and means, subject to said reference pulse, for transmitting a fixed number of signal pulses per engine revolution to said counter to increment said preload count until said preset count is reached, said means comprising a phase-locked loop having a loop output which provides said signal pulses, said phase-locked loop including an input for receiving "M" pulses per engine revolution, and wherein said means for transmitting a fixed number of signal pulses further includes frequency divider means connected to said phase-locked loop so that the loop oscillator frequency is "N" times the input frequency "M" so that said loop output provides "MN" signal pulses per engine revolution, whereby said control pulse is produced, and distributor means for receiving said reference pulse and, subject to said control pulse, for converting said reference pulse into an output pulse for controlling an engine operating event.

2. A digital timing control system in accordance with claim 1 wherein said frequency divider means is constructed so that the product "MN" is large enough so that said loop output provides at least one signal pulse per degree of engine rotation.

3. A digital timing control system in accordance with claim 1 wherein said means for transmitting said "MN" signal pulses per engine revolution to said counter comprises gate means and bistable device means, responsive to said reference pulse, for enabling said gate means for transmitting said signal pulses to said counter and, responsive to said control pulse, for disabling said gate means for preventing transmittal of said signal pulses until the occurrence of another reference pulse.

4. A digital timing control system in accordance with claim 1 wherein said means for providing said preload pulses to said counter for a predetermined period of time includes an oscillator having an output for providing said preload pulses.

5. A digital timing control system in accordance with claim 4 wherein said means for providing said preload pulses further includes monostable device means, responsive to said control pulse, for applying an enabling pulse to said oscillator for said predetermined period of time to enable said oscillator output to provide said preload pulses to said counter.

6. A digital timing control system in accordance with claim 4 wherein said oscillator comprises a voltage controlled oscillator having an input for receiving a variable D.C. voltage, whereby said oscillator output provides preload pulses having a variable frequency dependent upon the magnitude of said variable D.C. voltage so that said preload count can be varied subject to the magnitude of said variable D.C. voltage.

7. A digital timing control system in accordance with claim 1 wherein said means for transmitting a fixed number of signal pulses per engine revolution includes a phase-locked loop having a loop output which provides said signal pulses, and having a variable D.C. voltage output with a magnitude which is an analog of the speed of engine rotation, and wherein said means for providing said preload pulses includes a voltage controlled oscillator having an input for receiving said phase-locked loop variable D.C. voltage output and having an output for providing said preload pulses, said preload pulses having a variable frequency dependent upon the magnitude of said variable D.C. voltage output, whereby said preload count is varied subject to the speed of engine rotation.

8. A digital timing control system in accordance with claim 7 wherein said means for providing said preload pulses includes monostable device means, responsive to said control pulse, for applying an enabling pulse to said oscillator for said predetermined period of time to enable said oscillator output to provide said preload pulses to said counter.

9. A digital timing control system for an internal combustion engine comprising a processing circuit for receiving a cyclical engine timing reference pulse corresponding to an engine cylinder and for producing a cyclical control pulse offset from said reference pulse, said processing circuit including means including a counter for producing a control pulse when said counter reaches a preset count, means, subject to said control pulse, for resetting said counter, means including an oscillator having an output for providing preload pulses to said counter for a predetermined period of time to establish a preload count, a phase-locked loop including and input for receiving "M" pulses per engine revolution and having a loop output, frequency divider means connected to said phase-locked loop for changing the loop oscillator frequency to "N" times the input frequency "M" so that said loop output provides "MN" signal pulses per engine revolution, the product "MN" being large enough so that said loop output provides at least one signal pulse per degree of engine rotation, and means, subject to said reference pulse, for transmitting said "MN" signal pulses to said counter to increment said preload count until said preset count is reached, whereby said control pulse is produced.

10. A digital timing control system for an internal combustion engine comprising transducer means for producing a plurality of cyclical engine timing reference pulses respectively corresponding to a plurality of engine cylinders, processing circuit means for receiving said cyclical engine timing reference pulses and for producing cyclical control pulses respectively offset from said reference pulses, said processing circuit means including means including a counter for producing one of said control pulses when said counter reaches a preset count, means, subject to said control pulse, for resetting said counter, means including an oscillator having an output for providing preload pulses to said counter for a predetermined period of time to establish a preload count, rotation signal means for producing "M" pulses per engine revolution, a phase-locked loop including an input for receiving said "M" pulses per engine revolution and having a loop output, frequency divider means connected to said phase-locked loop for changing the loop oscillator frequency to "N" times the input frequency "M" so that said loop output provides "MN" signal pulses per engine revolution, the product "MN" being large enough so that said loop output provides at least one signal pulse per degree of engine rotation, and means, subject to said reference pulse, for transmitting said "MN" signal pulses to said counter to increment said preload count until said preset count is reached, whereby one of said control pulses is produced, and distributor means for receiving said cyclical reference pulses and, subject to said cyclical control pulses, for converting each of said reference pulses into an output pulse for controlling an engine operating event for a corresponding engine cylinder.

11. A digital timing control system for an internal combustion engine in accordance with claim 10 wherein said oscillator for providing said preload pulse comprises a voltage controlled oscillator and wherein said phase-locked loop includes a variable D.C. voltage output which is applied to said voltage controlled oscillator, the magnitude of which is an analog of the speed of engine rotation, whereby said voltage control oscillator output provides preload pulses having a variable frequency depending upon the magnitude of said variable D.C. voltage output so that said preload count is varied subject to the speed of engine rotation.

12. A digital timing control system in accordance with claim 11 wherein said distributor means includes interfacing means for shaping each of said reference pulses to a first logic level, means including a NAND gate connected to a monostable device means for producing a trigger pulse when one of said shaped reference pulses having said first logic level is applied to said NAND gate, clocked latch means having corresponding inputs and outputs for transferring in response to said trigger pulse, said one shaped reference pulse from one of said inputs to a corresponding output, inverter/buffer means for inverting, in response to said control pulse, said one shaped reference pulse appearing at said clocked latch output from said output pulse for controlling an engine operating event for a corresponding engine cylinder.

13. A digital timing control system for regulating the ignition timing of an internal combustion engine comprising transducer means for producing a plurality of cyclical reference pulses timed to correspond to a maximum desired spark advance for a plurality of corresponding engine cylinders, processing circuit means for receiving said cyclical reference pulses and for producing, in a predetermined manner, cyclical control pulses respectfully offset from said reference pulses to control the ignition timing of the corresponding engine cylinders, said processing circuit means including means including a counter for producing one of said control pulses when said counter reaches a preset count, means, subject to said control pulse, for resetting said counter, means including an oscillator having an output for providing preload pulses to said counter for a predetermined period of time to establish a preload count, rotation signal means for producing "M" pulses per engine revolution, a phase-locked loop including an input for receiving said "M" pulses per engine revolution and having a loop output, frequency divider means connected to said phase-locked loop for changing the loop oscillator frequency to "N" times the input frequency "M" so that said loop output provides "MN" signal pulses per engine revolution, the product "MN" being large enough so that said loop output provides at least one signal pulse per degree of engine rotation, and means, subject to said reference pulse, for transmitting said "MN" signal pulses to said counter to increment said preload count until said preset count is reached, whereby one of said control pulses is produced, and distributors means for receiving said cyclical reference pulses, and subject to said cyclical control pulses, for converting each of said reference pulses into an output pulse for triggering the ignition in a corresponding engine cylinder.

14. A digital timing control system for regulating the ignition timing of an internal combustion engine in accordance with claim 13 wherein said oscillator included in said means having an output for providing said preload pulses comprises a voltage controlled oscillator, and wherein said phase-locked loop includes a variable D.C. voltage output which is applied to said voltage controlled oscillator, the magnitude of which is an analog of the speed of engine rotation, whereby said voltage controlled oscillator output provides preload pulses having a variable frequency depending upon the magnitude of said variable D.C. voltage output so that said preload count is varied subject to the speed of engine rotation.

15. A digital timing control system for regulating the ignition timing of an internal combustion engine in accordance with claim 14 wherein said distributor means includes interfacing means for shaping each of said reference pulses to a first logic level, means including a NAND gate connected to a monostable device means for producing a trigger pulse when one of said shaped reference pulses having said first logic level is applied to said NAND gate, clocked latch means having corresponding inputs and outputs for transferring in response to said trigger pulse, said shaped reference pulse from one of said inputs to a corresponding output, inverter/buffer means for inverting, in response to said control pulse, said shaped reference pulse appearing at said clocked latch output from said first logic level to a second logic level to provide said output pulse for triggering the ignition in a corresponding engine cylinder.

16. A digital timing control system in accordance with claim 15 wherein said rotation signal means for producing "M" pulses per engine revolution includes said monostable device included in said distributor means, said trigger pulses produced by said monostable device means comprising said "M" pulses per engine revolution, and being applied to said input of said phase-locked loop.

17. A digital timing control system for an internal combustion engine comprising processing circuit means for receiving a cyclical engine timing reference pulse and for producing a cyclical control pulse offset from said reference pulse, said processing circuit means including means including a counter for producing said control pulse when said counter reaches a preset count, means, subject to said control pulse, for resetting said counter and for providing preload pulses to said counter for a predetermined period of time to establish a preload count, and means, subject to said reference pulse, for transmitting a fixed number of signal pulses per engine revolution to said counter to increment said preload count until said preset count is reached, whereby said control pulse is produced, transducer means for applying a plurality of cyclical engine timing reference pulses to said processing circuit means, each cyclical timing reference pulse corresponding to an engine cylinder, distributor means for receiving said cyclical reference pulses and, subject to a cyclical control pulse, for converting each of said reference pulses into an output pulse, said distributor means including interfacing means for shaping each of said references pulses to a first logic level, means including a NAND gate connected to a monostable device for producing a trigger pulse when one of said shaped reference pulses having said first logic level is applied to said NAND gate, clocked latch means having corresponding inputs and outputs for transferring, in response to said trigger pulse, said one shaped reference pulse from one of said inputs to a corresponding output, and inverter/buffer means for inverting, in response to said control pulse, said one shaped reference pulse appearing at said clocked latch output from said first logic level to a second logic level to provide said output pulse for controlling an engine operating event for a corresponding engine cylinder.

* * * * *